United States Patent [19]
Knott et al.

[11] 3,914,681
[45] Oct. 21, 1975

[54] RING MAGNET FIRING ANGLE CONTROL

[75] Inventors: Martin J. Knott, Lockport; Lloyd G. Lewis, La Grange; Herbert H. Rabe, Ingleside, all of Ill.

[73] Assignee: The United States of America as represented by the United States Energy Research & Development Administration, Washington, D.C.

[22] Filed: Nov. 6, 1974

[21] Appl. No.: 521,418

[52] U.S. Cl. .................................. 321/40; 321/5
[51] Int. Cl.² .................................. H02M 7/515
[58] Field of Search ........ 307/242, 252 N, 252 UA, 307/262; 321/5, 40, 47

[56] References Cited
UNITED STATES PATENTS

| | | | |
|---|---|---|---|
| 3,611,086 | 10/1971 | Mokrytzki et al. | 321/5 X |
| 3,662,247 | 5/1972 | Schieman | 321/5 |
| 3,683,261 | 8/1972 | Holtz et al. | 321/40 X |
| 3,803,476 | 4/1974 | Reeve | 321/5 |
| 3,863,133 | 1/1975 | Pollard | 321/40 X |

*Primary Examiner*—William M. Shoop
*Attorney, Agent, or Firm*—Dean E. Carlson; Arthur A. Churm; Paul A. Gottlieb

[57] ABSTRACT

A device is provided for controlling the firing angles of thyratrons (rectifiers) in a ring magnet power supply. A phase lock loop develops a smooth AC signal of frequency equal to and in phase with the frequency of the voltage wave developed by the main generator of the power supply. A counter that counts from zero to a particular number each cycle of the main generator voltage wave is synchronized with the smooth AC signal of the phase lock loop. Gates compare the number in the counter with predetermined desired firing angles for each thyratron and with coincidence the proper thyratron is fired at the predetermined firing angle.

8 Claims, 4 Drawing Figures

RING MAGNET FIRING ANGLE CONTROL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Synchrotron type accelerators utilize ring magnets for the guide field. The power supply for a ring magnet usually includes a main generator system which produces multiphase AC signals of equal frequency. These signals are rectified to produce a net DC voltage to be applied to the magnet. This is accomplished by applying each of the AC signals to a rectifier such as a thyratron. A thyratron is a rectifier tube which includes a grid which controls rectification. The AC signal is applied to the anode of the tube and with the appropriate potential applied to the grid the tube becomes conducting, that is, it fires. That point along each cycle of the AC signal applied to the rectifier in electrical degrees at which the tube fires is the firing angle for the tube. Once fired the tube continues to rectify until the cathode voltage exceeds the anode voltage. In practice the rectifier tubes are coupled with a common cathode connection so that when one tube fires any other will turn off according to the inherent nature of the connection. To produce the net DC voltage which is applied to the ring magnet each rectifier tube is sequentially fired at about the same firing angle so that while each tube is turned on its output is about equal to each other tube with only one tube operating at one time. At full rectify, maximum power is suppled to the ring magnet. When energy is removed from the magnet, at invert the output of rectifiers is a net negative DC signal.

When each tube is fired its output builds up to an equilibrium output so that its output is not a pure DC signal. Thus there appears a ripple in the net DC voltage suppled to the ring magnet. Other causes of ripple include incorrect spacing of the sequential firing of the rectifiers and instabilities inherent in the ring magnet power supply circuitry. Minimization of this ripple to produce as high a net DC voltage as possible is desirable for maximum magnet efficiency. In addition, the output of the main generator varies in frequency and is very distorted during operation of the ring magnet. Reduction in ripple and better adaptation to the varying generator AC output can be obtained if the firing angles for each rectifier can be regulated to 1/10 of an electrical degree. This is far beyond the capacity of conventional analog ramp-type firing angle control systems.

It is therefore an object of this invention to provide a rectifier firing angle control in a ring magnet power supply.

Another object of this invention is to provide a firing angles control capable of regulation to 1/10 of an electrical degree.

SUMMARY OF THE INVENTION

A device is provided for controlling firing angles of a plurality of rectifiers with each rectifier having applied to it an AC signal. The AC signals are developed by a main generator and are of equal frequency but different phase. A phase lock loop utilizes a voltage-to-frequency converter and an analog multiplier to produce a smooth AC signal at a constant phase difference from one of the AC signals developed by the main generator. A main counter is synchronized with the smooth AC signal so that it counts from zero to a particular number for each cycle of the main generator voltage wave. A firing angle selection circuit compares the number in the counter with predetermined desired firing angles for each rectifier and with coincidence of the counter number with the predetermined number, a firing pulse is directed to the appropriate rectifier.

DETAILED DESCRIPTION

Figure 1A:
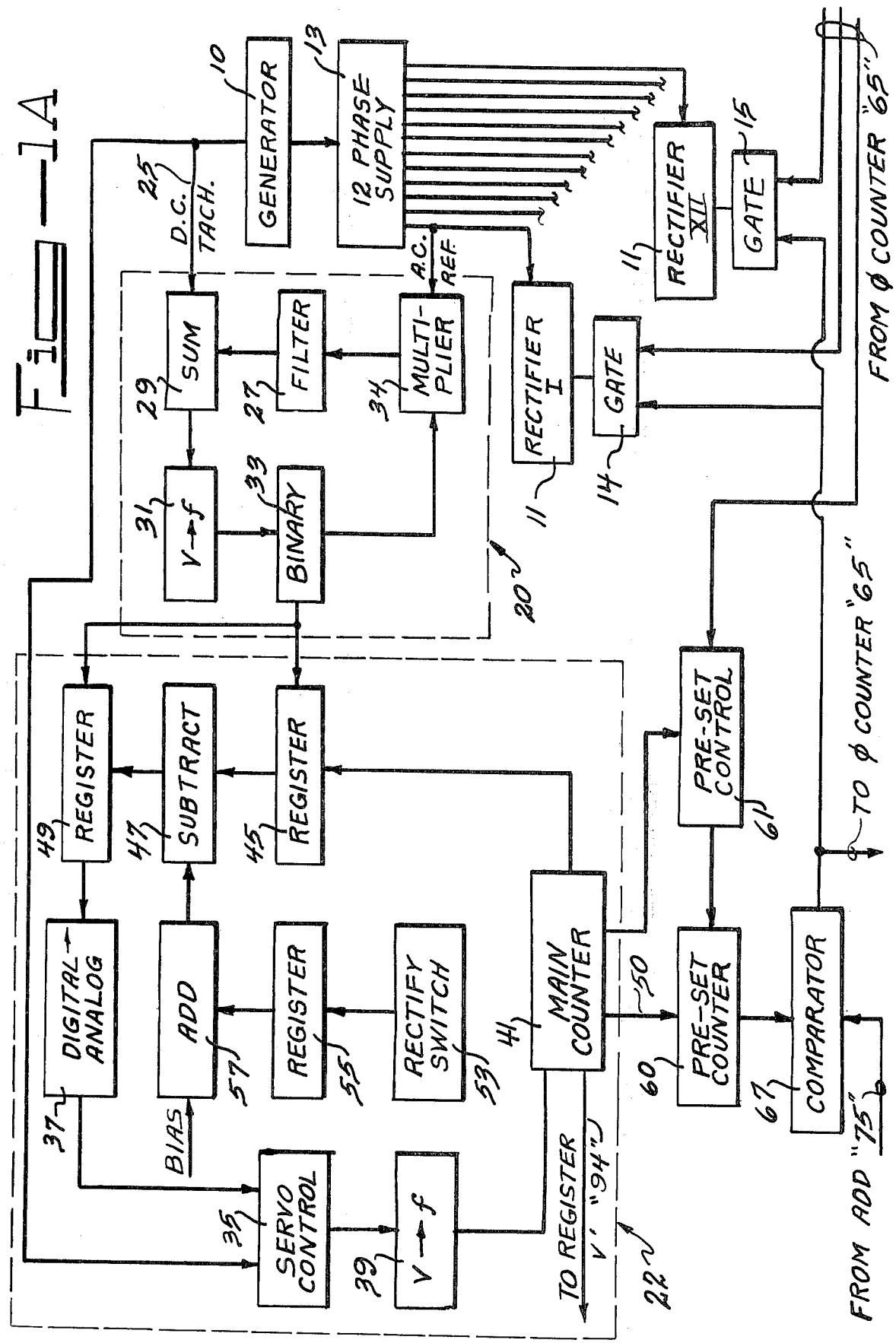
FIG. 1A is a block diagram of the phase lock loop and main counter loop of the firing angle control device.
Figure 1B:
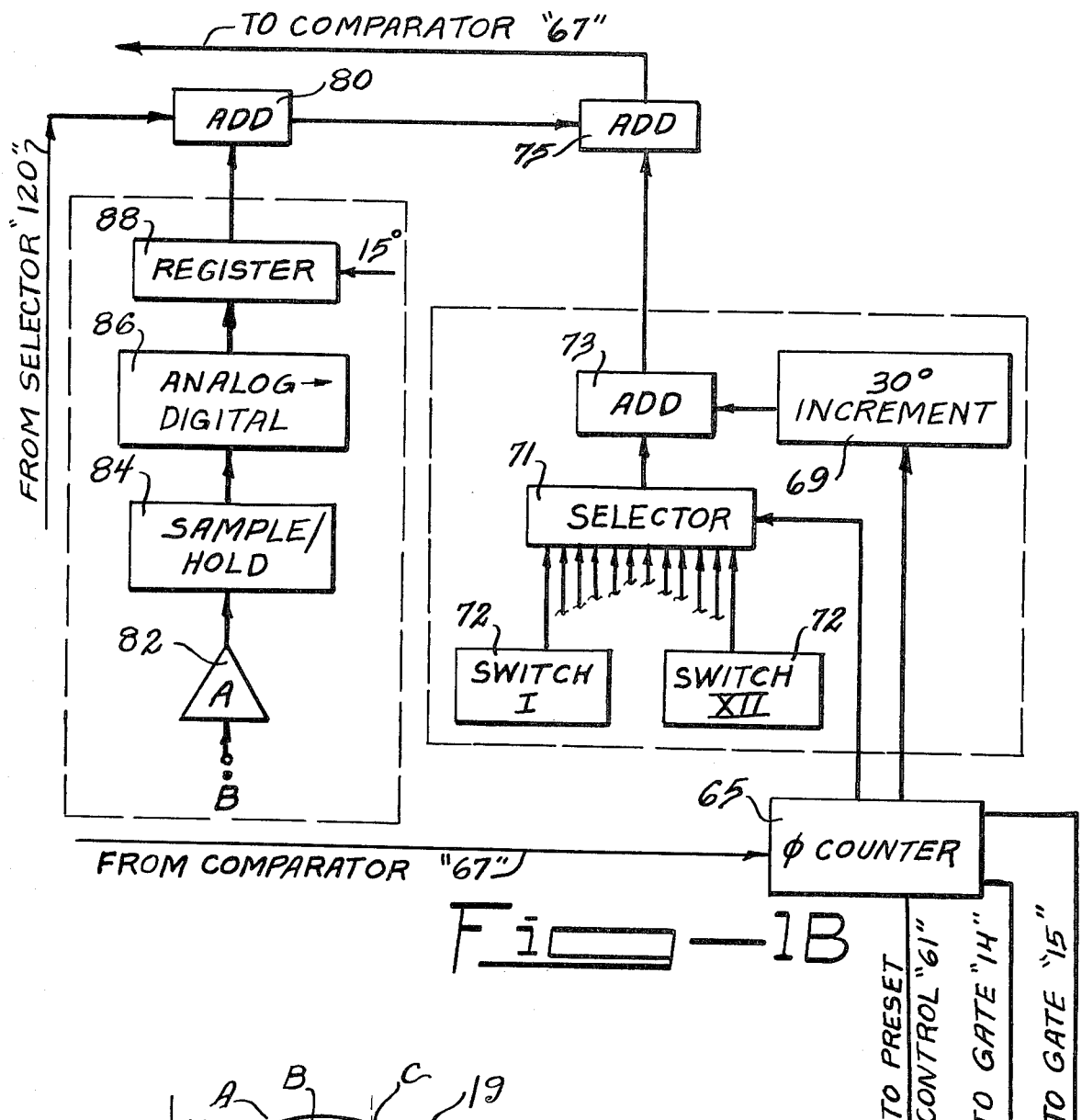
FIG. 1B is a block diagram of a part of the firing angle selection circuit.
Figure 1C:
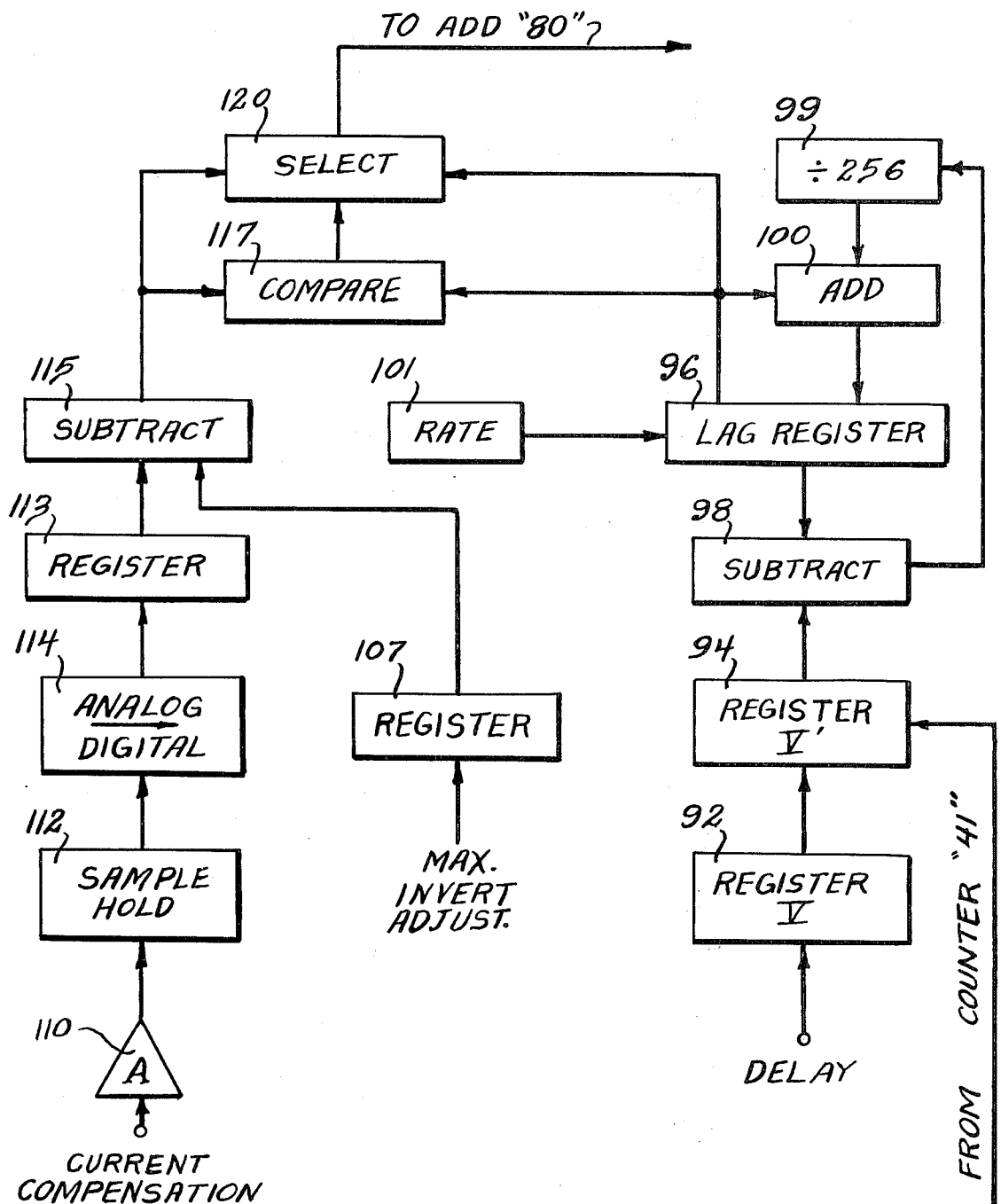
FIG. 1C is a block diagram of another part of the firing angle selection circuit.

Referring to FIG. 1A, FIG. 1B, and FIG. 1C there is shown a firing angle control for the rectifiers of a main ring magnet power supply. In the system illustrated there are twelve rectifiers 11, with only rectifiers I and XII shown. The power supply includes a main generator 10 generally having a three-phase AC output. Means are provided to increase the number of phases to that equal to the number of rectifiers. In this case, twelve-phase supply 13 generates the equivalent of a twelve-phase output signal with ideally a 30° difference between each successive AC output. Each AC signal is applied continuously to the anode of one of the rectifiers. Each rectifier is inhibited from rectifying by means such as a grid bias which is nonconducting. When the grid is biased to the appropriate voltage, the rectifier is turned on and is fired. The switching of the grid bias to an appropriate voltage is provided by gates 14 and 15 for the rectifiers shown. When a pulse is applied to the gates the bias of the grid is switched. The electrical angle along one cycle of the AC signals at which the rectifier is fired is the firing angle. The control system disclosed is designed to control the firing angle of each rectifier.

Figure 2:
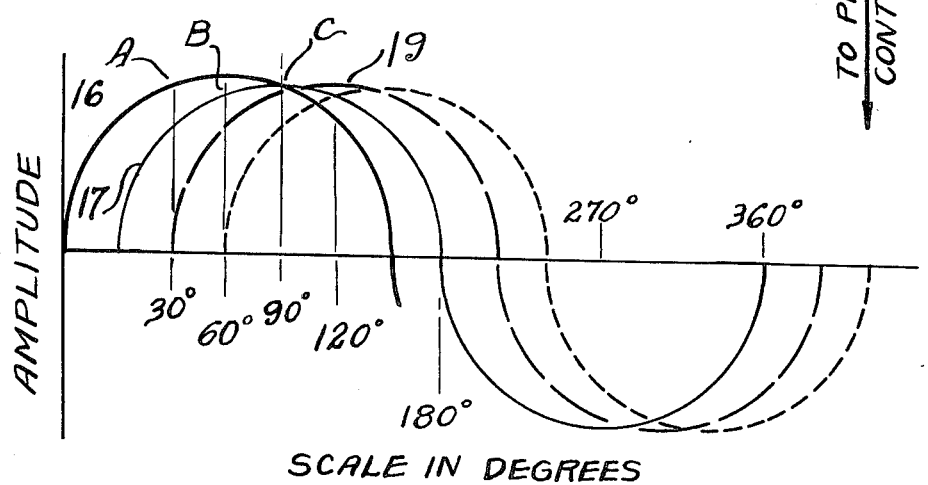
FIG. 2 is a set of curves showing multiphase AC signals that are applied to the rectifiers.

This is better understood with reference to FIG. 2 which shows three AC signals with each AC signal being applied to the anode of one rectifier II. For example, curve 16 might be the phase applied to the anode of rectifier I, curve 17 the signal applied to rectifier II and curve 19 the phase signal applied to rectifier III. The purpose of the firing angle control is to determine at what point along each AC signal each rectifier will be fired. The firing angle control determines at what angle between 0° and 360° along curve 16 a firing pulse will be sent to the gate 14 to allow the appropriate voltage to be applied to the grid of rectifier I to turn rectifier I on. As previously described, the rectifiers 11 are wired with a common cathode connection so that when a rectifier 11 is allowed to fire, any rectifier already on is automatically shut off. The cumulative effect is illustrated by considering the net output if each rectifier is fired after 30° from the beginning of its cycle, that is at points A, B and C on curves 16, 17 and 19, respectively. Rectifier I to which curve 16 is applied stays energized until rectifier II is energized and so on. The net result of the sequential firing of all 12 rectifiers is to generate approximately a DC voltage. When the highest positive DC is obtained and maintained the system is said to be in full rectify, because maximum energy is supplied to the ring magnet; while at any negative DC voltage the system is said to be at invert because energy is being removed from the ring magnet.

In particular, FIGS. 1A, 1B, and 1C show a device for precisely controlling the firing angle for each rectifier. FIG. 1A shows the phase lock loop 20 and the main counter loop 22. The phase lock loop 20 is intended to generate an AC signal which is in phase lock with the AC signal supplied by generator 10 to the anode of one of the rectifiers. Normally generator 10's voltage wave varies in frequency and is very distorted. Operation as a ring magnet power supply produces notches in this wave as large as 25 percent of the peak voltage so that a zero crossing type phase detector is not suitable. A DC tachometer voltage 25 from generator 10 is applied along with the output from filter 27 to operational amplifier 29 which sums the two signals. The DC tachometer voltage 25 is a DC signal which varies according to the speed of generator 10. The output of sum 29 is used to drive a voltage-to-frequency converter 31. V-f converter 31 produces an AC output such as a sawtooth whose frequency varies according to the relative level of the input voltage from sum 29. The output of V-$f$ converter 31 is applied to a binary or divide by two, that produces a square wave of frequency one-half that of the frequency of the V-$f$ converter 31. The square wave and one of the AC signals applied to the rectifiers 11 or one of the AC signals developed by generator 10 are applied to analog multiplier 34. The AC signal is referred to as the AC reference signal. The output frequency of the V-$f$ converter 31 is set to be approximately twice the AC reference frequency.

It is well known that the mathematical product of two sine waves of the same frequency but different phases produces a DC component plus a second harmonic component. The DC component depends upon the phase difference between the two sine waves. In a similar way, the product of a square wave and a distorted sine wave of the same period produces a DC component that is a function of the phase difference between the two waves. This fact is utilized in the phase lock loop 20 by applying the AC reference signal, (a distorted sine wave) and the square wave from the V-$f$ converter 31 to analog multiplier 34. The output of analog multiplier 34 contains DC and AC components and is fed to the low-pass filter 27 to filter out the AC component to complete a feedback loop. In effect, the DC component of the output of multiplier 34 varies the frequency of the V-$f$ converter 31 according to the phase difference between the sawtooth and the AC reference signal so that ultimately a constant phase difference is obtained and both signals are at approximately equal frequency. By adjusting the frequency of converter 31 initially to twice the frequency as the AC reference frequency, phase shifts between the AC reference and the square wave during operation are minimized. Note that the binary is provided to give an AC signal (the square wave) with equal half periods. This gives a more useable output from multiplier 34.

The phase lock loop would operate without the DC tachometer voltage 25, but the phase difference between the AC reference and the square wave in locked operation would vary with generator speed. By adjusting the level of the DC tachometer voltage 25 amplitude so that the DC output of filter 27 is nearly zero in the locked condition, the phase difference between the AC reference and the output of binary 33 is very nearly 90° and independent of generator speed. Thus the output of phase lock loop 20 is a square wave locked in phase with the AC of the main generator 10.

Main counter loop 22 is intended to provide a digital degree scale that has 360.0° per cycle of generator 10 and that is phase synchronized with the square wave from binary 33. DC tachometer voltage 25 is applied to servocontrol 35 along with the output from digital-to-analog converter 37. The output of servocontrol 35 which is a function of the DC tachometer voltage, the voltage from digital-to-analog converter 37 and the integral of the voltage from the digital-to-analog converter 37, is appled to a voltage-to-frequency converter 39. The output of converter 39 is a train of pulses with the number of pulses capable of being adjusted to give a desired number of pulses per electrical degree of the AC reference signal, as will be described. These pulses from converter 39 are applied to main counter 41 which counts these pulses. Main counter 41 includes means to clear the counter to zero each time the count reaches the desired number of counts per cycle of the AC reference signal. In the normal counter, the counter will simply roll over or reach its maximum count with the next count being zero. The counting by main counter 41 is synchronized with the signal from phase lock loop 20. The positive going edge of the square wave from binary 33 is applied as a gating pulse to register 45 which loads the number in main counter 41 coincident with the positive going edge. The number in register 45 is then subtracted by subtractor 47 from a reference number. The output of subtractor 47, the difference signal, represents the amount that the main counter is ahead or behind the reference square wave from binary 33 and is used as an error signal. The output of subtractor 47 is loaded into register 49 a short time delay after the positive going edge of the square wave from binary 33. Register 49 feeds digital to analog converter 37. Converter 37 produces an output voltage whose amplitude will vary according to the phase difference between the number in main counter 41 and the reference number. When this error signal, along with the DC tachometer signal and the integral of the error signal is used by the servocontrol 35, the effect is to speed up or slow down converter 39 so that the number transferred from the main counter is equal to the reference number.

The reference number from which the count in register 45 is subtracted is ideally 180° to allow for the maximum error signal from subtractor 47 to which main counter loop 22 may respond. That is, it will synchronize main counter 41 if it is within 180° of the reference number. The error signal from converter 37 along with the integral of the error signal is used to speed up or slow down the frequency of converter 39. Without the integral of the error signal used as part of the correction factor the count of the main loop counter would never quite be synchronized with the square wave from binary 33.

The reference number is programmed into main counter loop 22 by add 57 whose output is about 180°. Add 57 adds a bias number, and a small correction number. The correction number is input by rectify switch 53 whose input may be increased at 0.1° intervals. The value set by switch 53 is stored in register 55 and then added to the bias number by adder 57. The small correction provided by rectify switch 53 is used when the ring magnet power supply is at full rectify and precise firing angles for maximum output from the rectifiers are desired. By changing the reference number by 0.1° a small delay or advancement in firing angles for each rectifier is achieved.

The output 50 of main counter 41 is thus a certain count per electrical degree synchronized with the AC reference signal. The firing angle selection circuit illustrated in FIG. 1B and FIG. 1C is used to compare the number in main counter 41 with predetermined desired firing angles for each rectifier and to enable the firing of the appropriate rectifier at the appropriate firing angle. Note that the main counter loop 22 has been synchronized with the reference signal with a phase difference of 180°. However, the AC signal for one of the other rectifiers will be synchronized with 0 phase difference with the main loop counter. The other AC signals will be synchronized with phase differences with the main counter loop at multiples of 30°. At full rectify, rectifier I (which is the one with with 0 phase difference) turns on when the number in the main counter is 30°, rectifier II (which is the one with 30° phase difference) when the number is 60°, etc. Note that with the count at 60°, the AC signal applied to rectifier II or any other rectifier will be at 60° less than the phase difference between the AC signal applied to rectifier I and the one applied to the other rectifier. Thus by firing rectifier II when the main counter is at 60° rectifier II will be firing at the same point along its AC signal as rectifier I. This follows for all rectifiers.

At invert, each rectifier's firing angle may be delayed up to 155°, as will be described, so that several of the firing angles will occur in the following cycle of the main counter. Since the counter rolls over after 360° of the cycle for the first AC reference signal, the twelfth signal will be lost. Preset counter 60 counts in 0.1° steps and has a range beyond 360°, such as 530° or more. It is not cleared to zero but is preset to the number in the main counter at a specific time each cycle. Preset control 61 determines this specific time. The specific time is after both rollover and the firing of rectifier XII have occurred. If rectifier XII fires at 350° the preset counter 60 is set to 0° when main counter rolls over. If rectifier XII fires at 370° preset counter 60 is set to 10°. In effect preset counter 60 is not rolled over until rectifier XII has fired and begins a new cycle at the preset number.

Having synchronized the counter with the AC reference signal, it is necessary to match the proper firing angle with the counter number and to enable the proper rectifier. Referring to FIG. 1B, the phase counter 65 controls the distribution of the firing pulses to the gates for the rectifiers and determines the angular increments between the rectifier firings. If the phase counter 65 is in the first of its 12 states, it conditions the gate 14 of rectifier I to transmit the next firing pulse developed by comparator 67 to rectifier I. Gate 14 functions in effect like an AND gate requiring a pulse from phase counter 65 and a firing pulse to enable rectifier I. At the same time phase counter 65 conditions gate 14, it causes the output of 30° increment generator 69 to be the appropriate value and causes selector 71 to select from digital switches 72, the digital switch I which contains an individual desired firing angle for rectifier I and connects digital switch I to the input of adder 73. Adder 73 adds the number from digital switch I and the output of 30° increment generator 69 to get the desired firing angle. The output of adder 75 can be adjusted to be between 15° and 45° by adjusting the input from digital switch I. Without the correction from switches 72 each rectifier would be fired at 30° intervals. The switches allow for correction for instability in each firing angle. The value in adder 73 is added to various additional correction factors by adder 75. The additional correction factors for the desired firing angle depend upon whether the magnet is at full rectify or at invert. At flat top a feedback loop is provided to minimize field changes, while at invert, phase angle delay up to 155° to remove energy from the magnet is provided. When the number in the preset counter 60 is equal to or greater than the output of adder 75, comparator 67 develops a firing pulse. This pulse is transmitted to gate 14 and also to phase counter 65. Gate 14, since it has been enabled by phase counter 65, is responsive to this pulse from comparator 67 to allow firing of rectifier I. Phase counter 65 responds to the firing pulse from comparator 67 by advancing to the second of its 12 states. The cycle begins again with the output of 30° increment generator 69 being increased by 30°, rectifier II's gate being enabled and digital switch II being selected by selector 71 as the input for adder 73. This process continues until all 12 rectifiers have been fired. Then the cycle begins again with phase counter 65 in its first state and to increment at 30°.

The additional corrections which are provided for are added together by adder 80 which feeds adder 75 to give the final firing angle which will be compared with the count of preset counter 60. First there is the feedback correction which is governed by the change in magnetic field in the magnet with respect to time (Ḃ). This is a measure of the slope of the field that is being obtained from the ring magnet supply. This feedback system is used only at flat top to further smooth the field and consists of an input amplifier 82 whose output is proportional to Ḃ, a sample and hold 84, an analog-to-digital converter 86 and a register 88. The analog-to-digital converter 86 has an output range of 0° to 30° which varies according to the slope as described. When the feedback is not in use, when the magnet is not at flat top, the register is held at 15 degrees.

The portion of the firing angle selection circuit illustrated in FIG. 1B provides individual firing angle selection about multiples of 30°. However, it does not provide for changes in system firing angle, i.e. where each rectifier is to be fired with the AC signal applied to each rectifier at some phase difference or delay from 30°. This is provided by the digital control system illustrated in FIG. 1C. The desired delay in degrees is inputted to V register 92 each 0.1° as triggered by main counter. The the number is inputted to V' register 94. The number in lag register 96 is subtracted from the number in the V' register 94 by subtractor 98. The output of subtractor 98 is divided by a number such as 256 by divider 99 and the result is added to the initial value of the number in lag register 96 by adder 100. The number in lag register 98 then approaches the number in V' register 94 along a digitally generated exponential curve. The time constant is controlled by rate control 101. When the operator selects a firing delay he also selects a rate at which this delay is approached which is inputted to rate control 101 which controls the rate of updating of the lag register 96. The controlled changing of firing angle is necessary to prevent arc faults in the rectifiers 11 and to prevent distortions in the ring magnet field that would reduce accelerator beam intensity.

At maximum invert energy must be removed from the ring magnet as quickly as possible. Maximum invert also demands that a maximum firing delay be utilized by the firing angle selection circuit. Rectifier arc fault rate is dependent upon the amount of firing delay used. Less delay is permissible at high magnet currents than at low currents. Therefore it is necessary to limit firing delay with respect to magnet current. The maximum invert delay is inputted to register 107. While ideally the maximum delay would be 180°, in practice a more likely value would be 155°. A current compensation input is applied to amplifier 110. The current compensation is a signal proportional to the magnet current and may be in the form of a voltage obtained from a magnet current transductor (not shown) The output of amplifier 110 is fed to a sample and hold register 12 and then to an analog-to-digital converter 114 whose output number will be proportional to magnet current. This number is stored in register 113. The output of amplifier 110 is adjusted so that the number in register 113 will be the number of degrees the maximum invert angle must be reduced by to compensate for the particular level of magnet current. The number in register 113 is subtracted from the number in register 107 by subtractor 115 to give a limit on the amount of delay. The output of subtractor 115 which is the maximum allowable firing delay and the output of lag register 96 which will be the desired delay are compared by comparator 117 which determines which is the smaller number and sends a signal to selector 120 indicating which is the smaller number. Selector 120 then applies the smaller number as an additional correction to adder 80. In this way firing delay at desirable rates with respect to magnet current is provided.

The embodiment of the invention in which an exclusive property or privilege is claimed are defined as follows:

1. In a ring magnet power supply having a main generator for developing multiphase AC signals of equal particular frequency, a device for controlling the firing angles of a plurality of sequentially fired rectifiers, each rectifier having applied thereto one of the AC signals, comprising:

a first voltage-to-frequency converter developing a smooth AC signal of equal period to that of the multiphase AC signals, an analog multiplier coupled to said first converter and the main generator and being responsive to one of said multiphase AC signals and said smooth AC signal to develop a phase difference signal proportional to the product of said one of said multiphase AC signals and said smooth AC signal, said first converter being responsive to the DC component of said phase difference signal to vary the frequency of said smooth AC signal according to the voltage level of said DC component, thereby maintaining said smooth AC signal at a constant phase shift from said one of the multiphase AC signals, a second voltage-to-frequency converter developing a pulsed output signal, a main counter coupled to said second converter and being responsive to said pulsed signal to count and store the number of pulses of said pulsed signal, a comparator coupled to said first converter, said main counter and said second converter and being responsive to the positive zero crossing of said smooth AC signal to develop a DC error signal whose voltage varies according to the difference between the number stored in said main counter and a prescribed number, said second converter being responsive to said DC error signal to vary the frequency of said pulsed signal according to the voltage level of said DC error signal, thereby maintaining said pulsed signal at a constant phase difference from said smooth AC signal and the number of pulses of said pulsed signal per period of one of said multiphase AC signals at a constant value, and a firing angle selection circuit coupled to the rectifiers and said main counter for comparing the number stored in said main counter with a plurality of predetermined numbers, each of said predetermined numbers corresponding to a desired firing angle for one of the rectifiers, with the number stored in said main counter being equal to one of said predetermined numbers, said firing angle selection circuit acting to enable the firing of a particular rectifier at said particular rectifier's desired firing angle, said particular rectifier's desired firing angle corresponding to said one of said predetermined numbers.

2. The device of claim 1 further including a first adder coupled to said multiplier and said first converter, and means for developing a DC tachometer voltage proportional to the speed of the generator coupled to said first adder, said first adder being responsive to said DC tachometer voltage and the DC component of said phase difference signal to develop an output signal proportional to the sum thereof, said first converter being responsive to the output of said first adder to vary the frequency of said smooth AC signal according to the voltage level of the output signal from said first adder.

3. The device of claim 2 wherein said comparator includes a first subtractor coupled to said main counter and said first converter and being responsive to the positive zero cross of said smooth AC signal to develop a digital error signal whose value varies according to the difference between the number in said main counter and said prescribed number, a digital-to-analog converter coupled to said first subtractor and responsive to said digital error signal to develop a voltage level error signal proportional in value to said digital error signal, and a servocontrol coupled to said means for developing a DC tachometer voltage and said digital-to-analog converter and being responsive to said voltage level error signal and said DC tachometer voltage to develop said DC error signal, said DC error signal being a function of said DC tachometer voltage, said voltage error signal and the integral of said DC error signal.

4. The device of claim 3 further including a preset counter coupled to said main counter and said firing angle selection circuit and a preset control coupled to said main counter, said preset counter and said firing angle selection circuit and being responsive to both the completion of the sequential firing of each rectifier and the main counter rolling over to cause said preset counter to preset to the number in said main counter and to count from the preset number until the next preset number is stored in said preset counter, said firing angle selection circuit comparing the number in said preset counter with said plurality of predetermined numbers to enable the firing of said rectifiers.

5. The device of claim 4 wherein said firing angle selection circuit includes a plurality of gates with each gate coupled to one of said rectifiers and being capable of enabling the firing thereof, a phase counter coupled to each of said gates and developing a phase count signal indicating said particular rectifier to be fired, an increment generator coupled to said phase counter, said increment generator being responsive to said phase count signal to generate a digital output whose value is a multiple of 360° divided by the number of rectifiers, said multiple increasing by one for each successive firing of said rectifiers in response to said phase count signal, a second adder coupled to said increment generator, a plurality of digital switches equal in number to said rectifiers, each of said digital switches developing an output corresponding to a desired firing angle correction for one of said rectifiers, a selector coupled to said phase counter, said second adder and said digital switches and responsive to said phase count signal to couple the digital switch corresponding to said particular rectifier to said second adder, said second adder developing an output equal to the sum of the outputs of said increment generator and the digital switch coupled to said second adder, and a compare element coupled to said gates and said preset counter and being responsive to the number in said preset counter equaling the output of said second adder to generate a firing pulse, the gate for said particular rectifier being responsive to said firing signal and said phase count signal to fire said particular rectifier.

6. The device of claim 5 further including means for developing an analog signal proportional to $\dot{B}$ for the ring magnet, a first analog-to-digital converter coupled to said second adder and said means for developing an analog signal and being responsive to said analog signal to develop a digital signal proportional thereto, said second adder being responsive to said digital signal from said first analog-to-digital converter to add the value of said digital signal from said first analog-to-digital converter to said signal from the digital switch coupled to said second adder and said output from said increment generator and to develop an output equal to the sum thereof.

7. The device of claim 5 further including a lag register coupled to said second adder and having stored therein a number of particular initial values, a second subtractor coupled to said lag register and developing an output equal to the number in said lag register from a predetermined delay number, a divider coupled to said second subtractor and being responsive to the output thereof to develop an output equal to said output of said second subtractor divided by a particular number, and a third adder coupled to said lag register and said divider and being responsive to the output of said divider to develop an output equal to the sum of said divider and the number in said lag register, the number stored in said lag register being the output of said third adder, said second adder developing an output equal to the sum of the values stored in said lag register, the signal from said digital switch coupled to said second adder and the output of said increment generator.

8. The device of claim 5 further including means for developing a current signal proportional to the current in the ring magnet, a second analog-to-digital converter coupled to said means for developing a current signal and being responsive to said current signal to develop a digital signal proportional thereto, and a third subtractor coupled to said second adder and said second analog-to-digital converter and responsive to the digital output thereof to develop an output equal to the subtraction of the digital signal from said second analog-to-digital converter from a maximum invert angle number, said second adder being responsive to the output of said third subtractor to develop an output equal to the sum of the outputs of said third subtractor, the signal from the digital switch coupled to said second adder and the output from said increment generator.

* * * * *